May 14, 1935.  H. J. FALTICO  2,001,382
TESTING IMPLEMENT FOR SPARK PLUGS AND IGNITION
Filed April 27, 1934
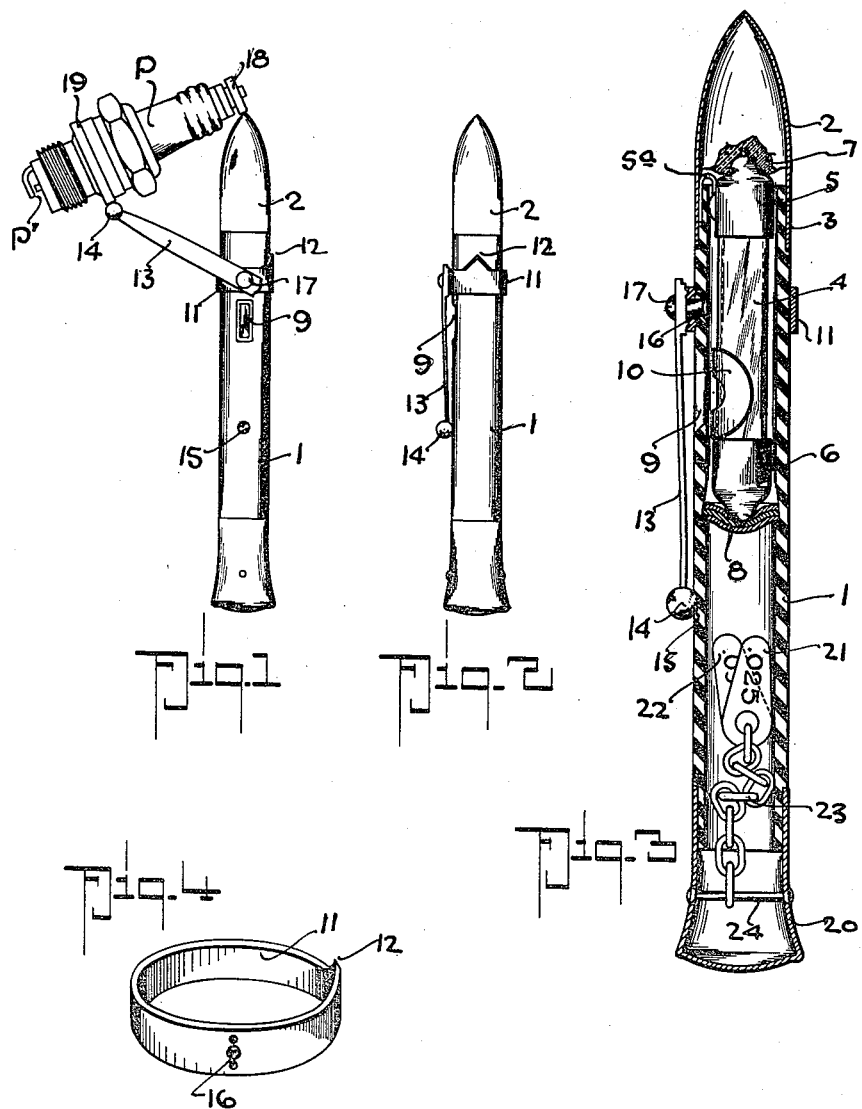
Harold J. Faltico
Inventor
By Herbert E. Smith
Attorney Patented May 14, 1935

2,001,382

UNITED STATES PATENT OFFICE 2,001,382

TESTING IMPLEMENT FOR SPARK PLUGS AND IGNITION

Harold J. Faltico, Spokane, Wash.

Application April 27, 1934, Serial No. 722,674

2 Claims. (Cl. 175—183)

My present invention relates to an improved testing implement for spark plugs employed in the ignition system of internal combustion engines such as are used in automotive vehicles, aircraft, and water craft.

The primary object of the invention is the provision of an implement adapted to be carried in the vest pocket, or other convenient location, when not in use, and which may with facility be applied to the spark plug for testing purposes. In carrying out my invention I combine in one element of the implement two functions by means of which this element is alternately used as a pocket-retainer for the implement, and as a conductor of the testing implement.

By the utilization of the hand-implement of my invention in testing the current in the spark plug I am enabled to ascertain the cause of a variety of objectionable and undesirable conditions existing, and the ignition expert may readily determine the presence of a short circuit, ascertain if sufficient current is passing through the spark plug to insure proper ignition, and to determine the proper distance or gap between the points of the spark plug. These conditions are indicated by the employment of a neon gas tube within the testing implement and an exterior gap arrangement, which give a visible indication of the existing conditions. By the results indicated by the testing implement the carburetion of the internal combustion engine may be adjusted for efficient performance of the engine, and various other adjustments may be made in tuning up the engine.

The invention consists in certain novel combinations and arrangements of parts as will hereinafter be more fully set forth and claimed. In the accompanying drawing I have illustrated one complete example of the physical embodiment of my invention, wherein the parts are combined and arranged according to the best mode I have thus far devised for the practical application of the principles of my invention.

Figure 1 is a view showing the testing implement in position for use with a spark plug.

Figure 2 is a view of the testing implement in position at right angles to that of Figure 1, or as seen from the right in Figure 1.

Figure 3 is an enlarged longitudinal sectional view of the implement.

Figure 4 is an enlarged perspective view of the exterior gap-band surrounding the implement, but removed therefrom.

In carrying out my invention I employ a tubular holder 1, of hard rubber, fiber, or other insulating material, which tube is open at both ends. One end of the tube is closed by the use of a pointed metallic cap 2, which is fashioned with a sleeve or skirt 3 that fits snugly over the open end of the holder and may be fastened thereon in suitable manner.

Within the holder is mounted a neon gas tube 4 having the terminal caps 5 and 6 sealing its ends, and the gas tube is held in stationary position within the holder by means of its sealing caps, of which the cap 5 is seated in an insulated retainer 7 in the contact cap 2, and the cap 6 of the tube is seated against a transverse cushion or insulated pad 8 in the tubular holder, and it will be understood that the gas-tube is illuminated when the contained gas is energized by the electric current.

As best seen in Figure 3 electric contact is made between the exterior pointed cap 2 of the implement, and a conductor wire 5a, which is fastened to the exterior surface of the sealing cap 5 of the neon gas tube in position to frictionally engage the inner face of the skirt or sleeve 3 of the cap 2.

A slot 9 in the wall of the tubular holder 1 forms a window through which the gas tube may be observed, and for the purpose of concentrating the vision on the illumined gas tube, the latter is provided with a shield or open-center disk 10 that is attached in suitable manner to the exterior of the glass tube and alined with the window 9, thereby permitting inspection to determine whether or not the gas in the tube is illuminated.

On the exterior of the tubular holder 1 I provide a gap-band 11, of copper or other suitable conducting material, and this circular band is fashioned with a gap-point 12 that is located a suitable distance from the contact-cap 2 in order to provide for jumping of the electric current across the gap between the cap 2 and the gap-point 12 and the consequent formation of a spark or flash between these conductors.

A pivoted conductor-clip or pivoted arm 13, of resilient metal that is a good conductor of electricity, is provided with a ball or spherical head 14 on its free end, and the exterior face of the tubular holder 1 is provided with an indentation or socket 15 in which this ball is held by the resiliency of the metal of the arm, when the arm is turned to inactive position.

The gap-band or annular conductor 11 is fashioned with a hole 16 in which the pivot pin 17 of the foldable arm 13 is mounted to turn, and it will be apparent that the conductor arm may be swung outwardly at an angle to the holder, as in Figure 1, where it is retained by frictional engagement of the pivot-end of the arm with the tubular holder, or with a mounting head thereon. When the arm is swung parallel with the tubular holder, as in Figures 2 and 3, the ball 14 engages in the socket 15 and the arm is held by the resiliency of its metal in this position.

In Figures 2 and 3 it will be apparent that the implement may be slipped into a pocket and the resilient conductor-clip 13 with its ball 14, may be snapped over the free edge of the pocket, similar to the fastening clip of a fountain-pen, for the purpose of retaining the implement in the pocket when the implement is not in use.

In Figure 1 I have shown a typical spark plug P with its points P' forming the gap as usual, and the terminal nut of the spark plug is indicated as 18, while the base nut of the plug, 19, is of course insulated from the wires or points of the plug and designed to be screwed into the head of the engine, and is grounded as usual.

In Figure 1 the contact-cap 2 is shown in contact with the terminal nut, and the ball 14 of the conductor-clip 13 is in contact with the base nut 19 of the plug. To determine whether or not the circuit is shorted, the engine is run or operated at a slightly accelerated speed. If the neon-tube is illumined, or glows brightly, the test indicates that the circuit is complete through the spark plug. If the gas-tube is not illumined, the test indicates that the circuit is interrupted through the spark plug.

With the parts in the same position as indicated in Figure 1, and to test whether or not the spark plug is receiving the required current from the coil through the distributer points and condenser of the ignition circuit, to the plug P, the engine is operated with rapidity several times. Under these conditions, if sufficient current is being supplied to the plug, a spark will appear and jump across the gap between the cap 2 and the gap-point 12. If the supply of current is insufficient, the insufficiency will be indicated by the absence of a spark between the contact-cap and the gap-point. This insufficiency of current may be caused by undesirable conditions existing at the contact points, the coil, or in the condenser, and when discovered, the undesirable condition may be remedied.

To indicate the condition of the points P' of the spark plug, the engine is operated at an idling speed, and should the spark appear to jump across the gap between the cap 2 and the gap-point 12, the indications are that the points P' are either improperly spaced, or burned out.

If the points are improperly spaced they may readily be adjusted by use of the two gage-plates, 21 or 22, the former for high compression engines, and the latter for low compression engines. These gage-plates are attached to the removable cap 20 that is attached at one end of the tubular holder, and the plates are fastened at one end of the chains 23, while the other ends of these chains are fastened to a cross pin 24 in the cap 20. When the plates are not in use they are housed in the tubular holder 1 as indicated in Figure 3. When required for use, the cap may readily be removed from the tubular holder and the gage plates dangling therefrom are suspended on the cross pin, readily accessible so that the desired gage plate may be selected for use.

The carbureter of the engine may also be adjusted in accord with results indicated by the use of the testing implement as indicated in Figure 1, the various other adjustments may be made for enhancing the operation and efficiency of the engine, as will be apparent to the engine expert or mechanic.

Having thus fully described my invention, what I claim as new and desire to secure by Letters Patent is:

1. In a spark-plug testing implement, the combination with a holder having a contact-cap mounted thereon, of an exterior gap-band mounted on the holder and having a gap-point adjacent the cap, a foldable conductor arm of resilient material pivotally mounted on said band, said holder having an exterior socket, and a head on the free end of the arm adapted to engage in said socket when the arm is in active position.

2. In a spark-plug testing implement, the combination with a tubular slotted holder having a contact-cap, a neon gas tube mounted within the holder in electrical connection with the cap, of a gap-band mounted on the exterior of the holder and a gap-point integral with the band and located adjacent the cap, and a pivoted, foldable conductor arm mounted on said band.

HAROLD J. FALTICO.